United States Patent [19]
Lovness

[11] 3,747,260
[45] July 24, 1973

[54] INSECT KILLER
[75] Inventor: Donald E. Lovness, Stillwater, Wash.
[73] Assignee: Judd Ringer Corporation, Eden Prairie, Minn.
[22] Filed: Mar. 18, 1971
[21] Appl. No.: 125,762

[52] U.S. Cl. ............................ 43/131, 43/132 R
[51] Int. Cl. .................. A01m 01/02, A01m 01/20
[58] Field of Search .................... 43/131, 132 R; 206/56 AA, DIG. 17; 229/3.5 MF

[56] References Cited
UNITED STATES PATENTS

| | | | |
|---|---|---|---|
| 3,040,470 | 6/1962 | Kanin | 43/131 |
| 2,953,868 | 9/1960 | Chambers | 43/131 |
| 2,063,768 | 12/1936 | Staffel | 43/131 |
| 3,032,915 | 5/1962 | Giroud-Abel | 43/131 |
| 2,139,040 | 12/1938 | Salfisberg | 43/131 UX |
| 1,077,835 | 11/1913 | Kelly | 43/131 UX |
| 3,304,646 | 2/1967 | Staley | 43/131 |
| 3,630,446 | 12/1971 | Strengelbach | 43/131 X |
| 3,156,355 | 11/1964 | Rodgers | 206/56 AA |
| 3,534,887 | 10/1970 | Ginsberg | 206/DIG. 17 |
| 3,510,054 | 5/1970 | Sanni et al. | 206/56 AA X |
| 3,295,246 | 1/1967 | Landsman et al. | 43/131 |

Primary Examiner—Robert Peshock
Assistant Examiner—James H. Czerwonky
Attorney—Frederick E. Lange and William C. Babcock

[57] ABSTRACT

An insect poisoning and killing device for ants or similar insects in which the poison is enclosed in a casing formed by two flexible sheets of material sealed together around their periphery with indicia indicating a line for cutting off a corner of the casing, the casing being effective when such a corner is cut off and the adjacent material of said casing is distorted to form a passage through the casing at this corner. The passage is sufficiently large to permit the passage of ants therethrough but not sufficiently large to permit the passage of or to attract larger animals. The ant poison is in a solution which impregnates a plurality of folded layers of fibrous material. The passage defines a region having a maximum, distorted cross-sectional area substantially less than the normal cross-sectional area of the fibrous material, so as to retain the fibrous material in the container.

6 Claims, 5 Drawing Figures

PATENTED JUL 24 1973                    3,747,260
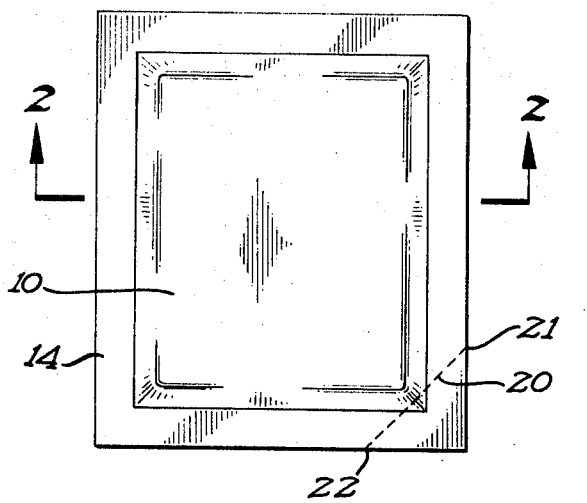
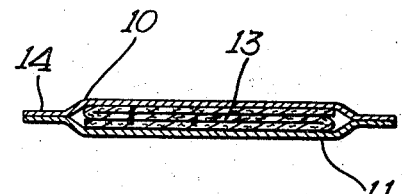
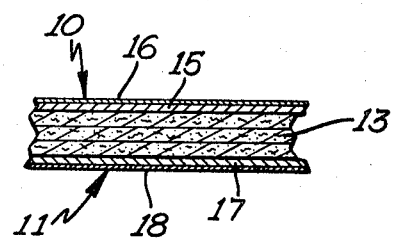
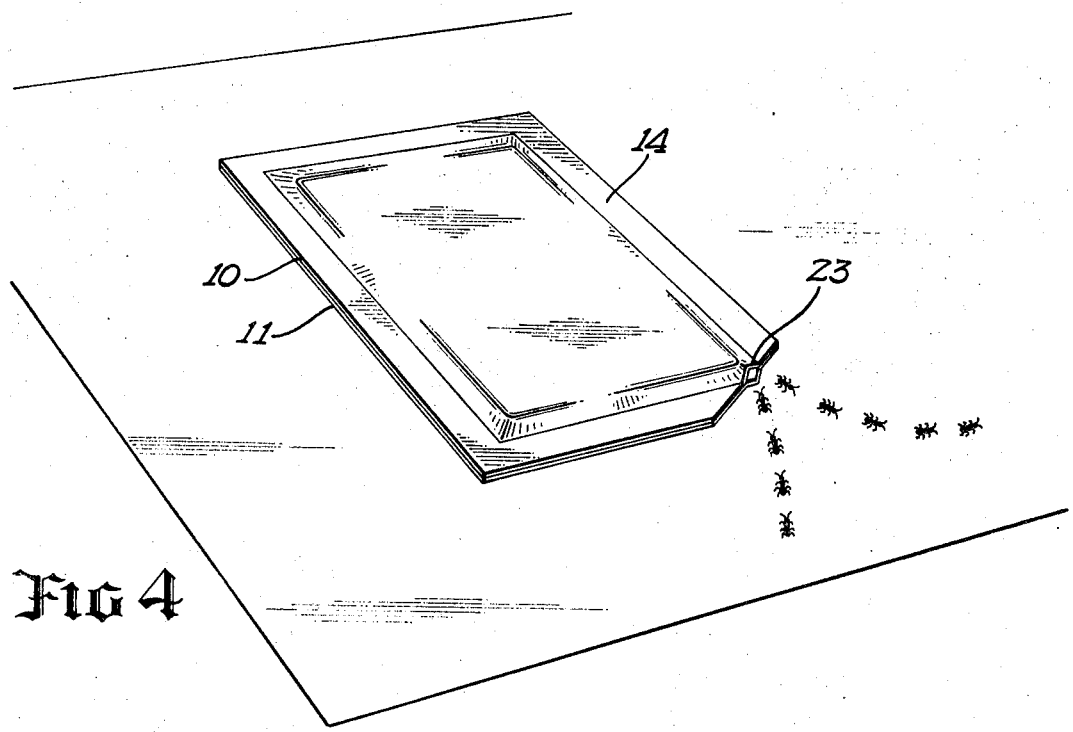
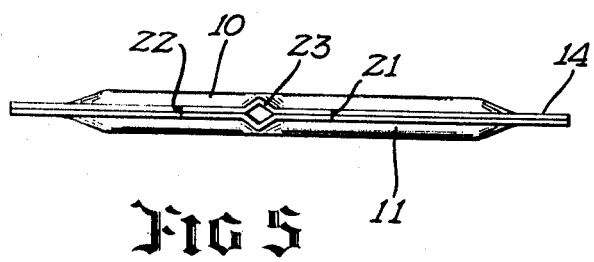
INVENTOR.
Donald E. Lovness
BY
ATTORNEY

INSECT KILLER

BACKGROUND OF THE INVENTION

Various devices have been proposed for destroying ants or similar insects that invade a household or other building occupied by humans. It is quite common practice to provide for this purpose some form of poison, usually added to a sweetening agent which attracts the ants. The advantage of poison is that the ants return to their nest and die there. The dead ants are devoured by the other ants and the poison is transmitted from ant to ant.

One of the drawbacks of using poison in a building occupied by humans, particularly in a home in which there are small children or pets, is that it is difficult to make the poison accessible to the ants or similar insects without creating the possibility that the poison will be eaten by children or animals. Arrangements have been developed for placing the poison within a container having normally covered openings through which ants can crawl in order to get at the poison when a cover is removed from the opening. One difficulty with these prior arrangements is that the containers have been made of a rigid material and have been somewhat bulky so that the cost of shipping has increased. Moreover, such a container may be tempting to chew on for a pet such as a dog. Since the containers are usually relatively thin for shipping and cost reasons, they can readily be crushed by the jaws of a dog, thus exposing the dog to the poison. Furthermore, they are usually formed of molded casings which can be somewhat expensive to manufacture. Since the ant poisons are often in the form of solutions impregnating some carrier material, the life of such a device is relatively limited after the openings have been exposed. This is due to the fact that the carrier for the solution dries out. It is hence desirable to make the container for the ant poison as inexpensive as possible so that it can be readily discarded without any great loss.

SUMMARY OF THE PRESENT INVENTION

The present invention is concerned with a device for poisoning ants or similar insects in which a casing enclosing the poisonous material is formed of two sheets of flexible material joined together at their outer edges except for a small opening adjacent outer edges of the material. The two sheets are normally secured together around their entire periphery. When it is desired to use the device, a small peripheral portion is cut away, the cut extending through a small portion of the casing in which the two sheets are not joined together. By pinching the edges together, an opening can be formed at the point where the sheets are not joined together. This opening is sufficiently large to permit the entrance and egress of ants but is much too small to either permit larger animals to enter or to attract the attention of larger animals. The material in the casing should be relatively moisture impermeable where the poison is in the form of a solution. This also results in less tendency for the odor of the poisonous solution to attract other animals. Particularly where a foil is employed to form the sheets of impermeable material, the material of the sheets is relatively unattractive in taste and is not apt, for this reason, to attract the attention of larger animals or children.

The material of which the casing is formed should preferably be readily severable as by scissors and it is desirable that suitable indicia such as a dotted line be imprinted thereon to indicate where the cut should be made. It will be appreciated that while one such dotted line is all that is necessary to accomplish the purpose of this invention, it is possible to employ several such dotted lines to provide various openings. Where the sheets of material are of a rectangular configuration, dotted lines are preferably across corners of the package.

While my invention is not limited to any particular form of poison or any particular method of incorporating the poison into the casing, the method which I have found extremely desirable is the use of a poison mixed with various sweetening materials and dissolved in water, the solution being used to impregnate folded layers of fibrous material. The fibrous material may be very similar to that commonly employed in moist towelettes which are packages in a manner very similar to that employed by me in connection with my ant poisoning device.

Further objects of the invention will be apparent from a consideration of the accompanying specification, claims and drawing.

BRIEF DESCRIPTION OF THE DRAWING

FIG. 1 is a plan view of my improved insect poisoning device;

FIG. 2 is a sectional view taken along the line 2—2 of FIG. 1;

FIG. 3 is a fragmentary sectional view similar to FIG. 2 but on a much larger scale;

FIG. 4 is a view showing my ant killing device on a supporting surface with a corner of the device removed showing ants entering and leaving the device; and FIG. 5 is an elevational view looking at the corner of the device which has been severed and which has been distorted to provide the opening for the ants.

DESCRIPTION OF THE PREFERRED EMBODIMENT

Referring to FIGS. 1 and 2, it will be noted that my insect killing device includes two sheets 10 and 11 of flexible material which enclose a plurality of folded layers of fibrous material 13, the flexible sheets 10 and 11 being joined together completely around their peripheral edges. As is evident from FIGS. 1 and 2, the central portions of the sheets are spaced apart, the fibrous material 13 being disposed between these spaced central portions. The edges of the sheets are sealed together over a substantial width of their peripheral portions, these sealed portions being indicated by the reference numeral 14. They may be sealed together in any suitable manner such as by heat sealing or the use of an appropriate adhesive. While the sheets 10 and 11 are shown in FIG. 2 as being a single layer of material, it is often desirable to form sheets 10 and 11 of metallic foil in order to obtain a high degree of moisture impermeability. When this is done, the foil is preferably coated to make the unit more attractive and to facilitate the application of various indicia thereon identifying the product, explaining its use, and indicating where the material should be cut to enable access by the ants to the poison. Referring to FIG. 3, it will be noted that the two sheets 10 and 11 each consists of two layers. Referring specifically to sheet 10, this consists of a layer of foil 15 and a coating 16. Similarly, sheet 11 consists of a layer of foil 17 and a coating 18.

The coating is preferably of a material that can be readily printed. The necessary indicia are applied to the coated sheets before they are formed into the casing. It will furthermore be noted from FIG. 3 that the fibrous material 13 consists of a number of layers of folded material. This material can be very much the same type as is employed in the conventional moist towelettes.

It will be appreciated that while I have specifically referred to the use of foil on which is applied a coating which can be readily printed, it will be obvious that any of various other materials may be employed for forming the casing. If the poison employed is a dry poison, it is not as imperative that the casing be moisture impermeable as when the material is in solution.

While I prefer to use a poison in an aqueous solution, the poison could be in the form of a dry poison, as suggested above, or incorporated into an oil carrier. When an aqueous solution is employed, I have found the following solution desirable for the purpose:

| | |
|---|---|
| 60.4 percent | water |
| 0.11 percent | tartaric acid |
| 29.6 percent | sugar |
| 5.71 percent | honey |
| 3.44 percent | glycerine |
| 0.24 percent | propionic acid |
| 0.5 percent | wettable powder containing 25 percent Kepone |

The term Kepone is a commercial trade name for an insecticide sold by Allied Chemical. The chemical name for Kepone is Decachlorooctahydro-1,3, 4-metheno-2H-cyclobuta-(cd) pentalen-2-one.

It will be noted from FIG. 1 that imprinted on the sheet 10 of the casing is a dotted line 20. This dotted line extends diagonally from point 21 on the outer edge of one peripheral portion 14 through adjacent peripheral portions 14 to point 22 on the outer edge of the adjacent peripheral portion. It will be noted, however, that the center portion of dotted line 20 extends through a portion of the casing in which the two sheets 10 and 11 are not secured together. If the outer peripheral corner of casing 10 is cut away by cutting along line 20 there is thus an intermediate portion along the line of severance in which the two sheets are not sealed together. If the material of the casing adjacent this intermediate portion is now squeezed together, the result is an opening 23 such as shown in FIGS. 4 and 5. It will be obvious that if the dotted line 20 extended over a larger portion of the casing so as to pass through more of the center portion of the casing in which the sheets 10 and 11 are not sealed together, this opening would be much larger. The dotted line 20 is preferably so placed that the resulting opening 23 is sufficient for the purpose of permitting ants to be attracted and pass freely through the opening but still small enough to prevent larger animals such as house pets or children from being attracted.

Because the sheets 10 and 11 and the fibrous material impregnated with the poisonous solution are all flexible, it is readily apparent that the device of the present invention is compact and readily shipped. A large number of such units can be placed in a relatively small container and there is relatively little likelihood of damage from impact with other units. Furthermore, due to the fact that mass production techniques are already available in connection with moist towelettes, for encasing folded fibrous material impregnated with a liquid in a casing of this type, it is possible to produce these for a very small amount. After the casing has been cut along the line 20 and used to poison ants, it can be readily thrown away and there is no great financial loss. Each time it is again desired to poison ants, a new package can be removed from the container and be made ready for operation by cutting along the line 20. It is thus possible always to have a fresh unit in operation with a minimum of expense. Further, because of the relatively small opening resulting from cutting along the line 20 and because the material of sheets 10 and 11 may be relatively objectionable to chew on, the likelihood of pets or small children being attracted to the device and consuming the poison are relatively small.

While I have shown a specific embodiment of my invention for purposes of illustration, it is to be understood that the scope of the invention is to be limited solely by the scope of the appended claims.

I claim as my invention:

1. An insect-killing device for poisoning ants and other similar insects consisting of two spaced sheets of flexible, readily severable foil and a sheet of fibrous material impregnated with a liquid containing a substance toxic to such insects and disposed between the central portions of said two sheets, the outer peripheral portions of said two sheets being joined together about their entire peripheries to form a flexible casing for said fibrous material, the outer surface of at least one of said sheets having indicia thereon indicating a line for severing overlying outer peripheral portions of said sheets from the remainder thereof, said line extending through two parts of said outer peripheral portion of said sheet on which the indicia appears and an intermediate small region of the central portion of which is not joined with the corresponding portion of the other sheet so that when said sheets are cut along said line and said sheets are distorted adjacent the small region of said central portions, there is produced an opening between said sheets which is of a size to permit the passage of such insects but not sufficiently large to permit the passage of or to attract larger animals, said line being so positioned on said sheet that said region has a maximum distorted cross-sectional area substantially less than the normal cross-sectional area of said fibrous material to prevent withdrawal of said fibrous material through said passage.

2. The device of claim 1 in which said sheets are rectangular in outline and the outer peripheral portions to be removed form a corner of said casing including the small region in which said sheets are not joined together.

3. An insect-killing device for poisoning ants or similar insects consisting of two sheets of flexible foil having their outer peripheral portions joined together and a sheet of fibrous material impregnated with a liquid containing a substance toxic to such insects and disposed between central spaced portions of said sheets, said device being cut away along a line extending through said peripheral portions of both sheets and a small region of both sheets near the edge of the spaced central portions thereof, the material of both of said sheets being distorted adjacent to said small region near the edge of said central portions to separate said two sheets further at said small region to provide a passage therebetween to the fibrous material of a size to permit the passage of such insects but not sufficiently large to permit the passage of or to attract larger animals, said region having a maximum, distorted, cross-sectional area substantially less than the normal cross-sectional area of said fibrous material to prevent withdrawal of said fibrous material through said passage.

4. The device of claim 3 in which both sheets are the same in size and configuration.

5. The device of claim 3 in which the liquid containing said toxic substance also contains a sweet substance to attract the insects.

6. The device of claim 1 in which the sheet of foil on which said line indicia is applied is coated with material upon which the indicia can readily be applied.

* * * * *